United States Patent Office 3,532,467
Patented Oct. 6, 1970

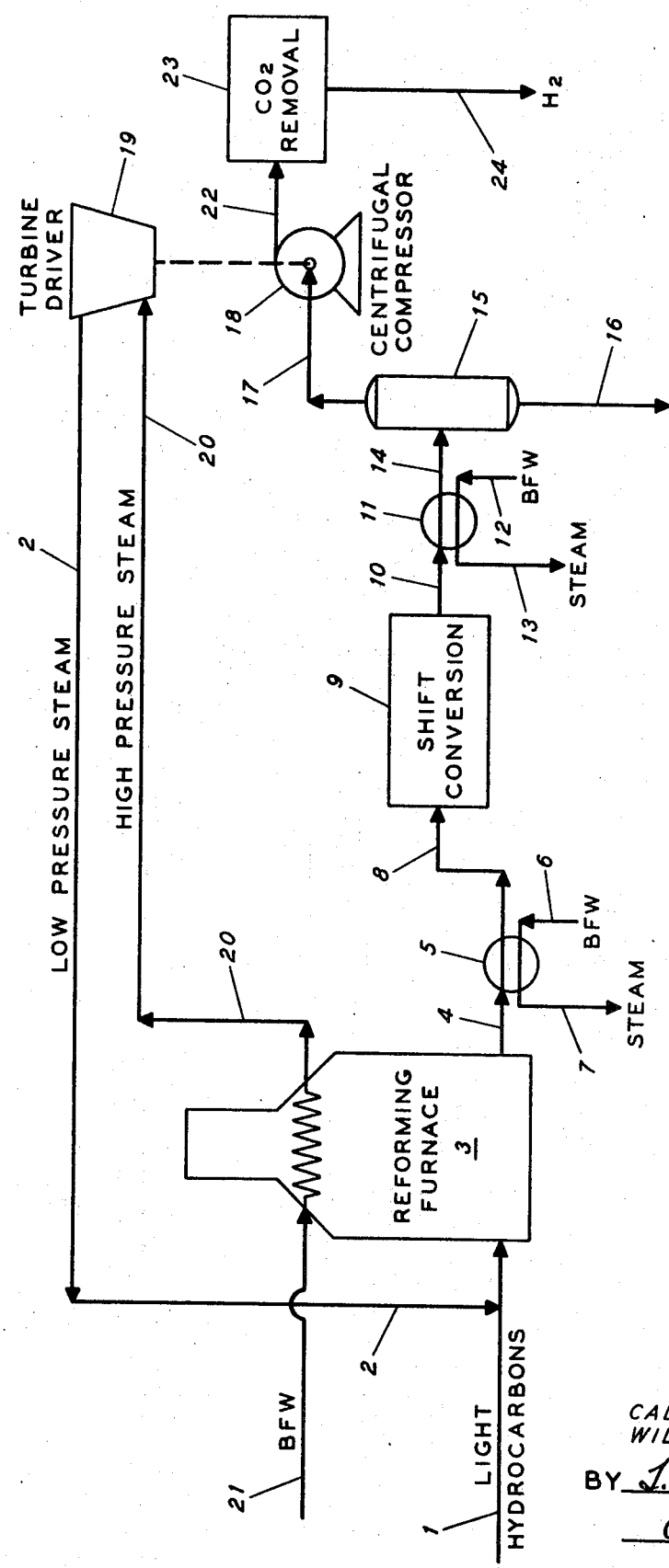

3,532,467
HYDROGEN MANUFACTURE WITH INTEGRATED STEAM USAGE
Calvin S. Smith and William J. McLeod, El Cerrito, Calif., assignors to Chevron Research Company, San Francisco, Calif., a corporation of Delaware
Continuation-in-part of application Ser. No. 736,520, May 17, 1968, which is a continuation-in-part of application Ser. No. 665,106, Sept. 1, 1967. This application Dec. 31, 1968, Ser. No. 788,262
Int. Cl. C01b *1/16*
U.S. Cl. 23—212                    10 Claims

ABSTRACT OF THE DISCLOSURE

A process for producing high pressure hydrogen which comprises:
(a) reforming hydrocarbons with low pressure steam to produce a gas stream comprising hydrogen and $CO_2$;
(b) centrifugally compressing said hydrogen before the $CO_2$ is completely removed;
(c) using high pressure steam to drive a turbine which turbine in turn drives the centrifugal compressor used to compress the hydrogen; and
(d) using low pressure exhaust steam from the turbine as said low pressure steam for reforming hydrocarbons in step (a).

CROSS-REFERENCES

This application is a continuation-in-part of Ser. No. 736,520 filed May 17, 1968, which in turn is a continuation-in-part of Ser. No. 665,106, filed September 1, 1967 and now abandoned.

BACKGROUND OF THE INVENTION

(1) Field of the invention

This invention relates to processes for the production, compression, and purification of gases; and, more particularly, it relates to a process for supplying high pressure, high purity hydrogen gas at elevated pressure. In a still more particular aspect, the invention relates to a process for obtaining high pressure, high purity hydrogen for use in a hydroconversion process. By hydroconversion process is meant a process wherein hydrogen is reacted with hydrocarbons so as to convert the hydrocarbons to more desirable hydrocarbons or hydrocarbon products.

(2) Description of the prior art (A) Means for obtaining raw, hydrogen-rich gas.—There are a number of current processes available for the production of raw hydrogen. Many of these processes use hydrocarbons as a source of hydrogen. Two of the most widely practiced methods of obtaining raw, hydrogen-rich gas are steam reforming and partial oxidation.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes most of the hydrocarbons react with steam to form hydrogen and carbon oxides. The tubes containing the catalyst are located in a reforming furnace, which furnace heats the reactants in the tubes to temperatures of 1,200–1,700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in hydrogen manufacture but are used where it is desirable to obtain a mixture of $H_2$ and $N_2$, as in ammonia manufacture. The basic reactions in the steam reforming process are:

$$C_nH_{2n+2} + nH_2O \rightleftharpoons nCO + (2n+1)H_2$$
$$C_nH_{2n+2} + 2nH_2O \rightleftharpoons nCO_2 + (3n+1)H_2$$

e.g., methane-steam:

$$CH_4 + H_2O \rightleftharpoons CO + 3H_2$$

and $$CH_4 + 2H_2O \rightleftharpoons CO_2 + 4H_2$$

Because the hydrogen product is used in high-pressure processes, it is advantageous to operate at high pressure to avoid high compression requirements. However, high pressures are adverse to the equilibrium; and higher temperatures must be employed. Consistent with hydrogen purity requirement of about 95 to 97 volume percent $H_2$ in the final $H_2$ product and present metallurgical limitations, generally the single stage reforming is limited commercially to about 1,550° F. and 300 p.s.i.g.

In typical partial oxidation processes, a hydrocarbon is reacted with oxygen to yield hydrogen and CO. Insufficient oxygen for complete combustion is used. The reaction may be carried out with gaseous hydrocarbons or liquid or solid hydrocarbons; for example, with methane, the reaction is:

$$CH_4 + \tfrac{1}{2}O_2 \rightleftharpoons H_2 + CO$$

With heavier hydrocarbons, the reaction may be represented as follows:

$$C_7H_{12} + 2.8O_2 + 2.1H_2O \rightleftharpoons 6.3CO + .7CO_2 + 8.1H_2$$

Both catalytic and noncatalytic partial oxidation processes are in use. Suitable operating conditions include temperatures from 2,000° F. up to about 3,200° F., and pressures up to about 1,200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial CO in the hydrogen-rich gas generated by either reforming or partial oxidation. To convert the CO to $H_2$ and $CO_2$, one or more CO shift conversion stages are typically employed. The CO shift conversion reaction is:

$$CO + H_2O \rightleftharpoons H_2 + CO_2$$

This reaction is typically effected by passing the CO and $H_2O$ over a catalyst such as iron oxide activated with chromium. The reaction kinetics are faster at higher temperature, but the equilibrium to hydrogen is favored by lower temperatures. Therefore, it is not uncommon to have a high temperature shift stage followed by a low temperature shift stage. Pressure has little bearing on the equilibrium in the water-gas shift reaction.

(B) $CO_2$ or $CO_2+H_2S$ removal.—Because most hydrogen-using processes, particularly hydroconversion processes, operate more efficiently with high purity hydrogen, it is generally required to remove impurities, such as $CO_2$, from the raw hydrogen generated in the hydrogen plant before the hydrogen is passed to the hydrogen-using process. Perhaps the most widespread method of removing $CO_2$ from other gases is the absorption of $CO_2$ in an alkanolamine, such as diethanolamine (DEA) or monoethanolamine (MEA). Largely because of its relatively low molecular weight, MEA is generally the preferred absorbent of the alkanolamines. The $CO_2$ forms a loose chemical bond with the amine when it is absorbed.

In using any of the commonly used alkanolamine absorbents, an absorber and stripper are typically arranged in a figure eight process configuration. The $CO_2$-containing gas is fed into the bottom of the absorber where $CO_2$ is absorbed in downward flowing absorbent. Purified gas with the $CO_2$ removed leaves the top of the absorber. Rich absorbent from the bottom of the absorber is passed to the top of a stripping column where it is regenerated as it passes from the top to the bottom of the stripping column. The regenerated absorbent passes from the bottom of the stripper to the top of the absorber to complete the figure eight path of the absorbent as it flows down through the absorber trays, or packing material, absorbing $CO_2$. A large amount of heat is required to strip the $CO_2$ from the MEA absorbent which is typically used because of the chemical bond that occurs between the $CO_2$ and the MEA. For instance, in a large hydrogen plant producing $135 \times 10^6$ standard cubic feet per day of hydrogen, over $300 \times 10^6$ B.t.u.'s per hour are generally required to reboil the MEA in order to effect the regeneration of the MEA. These $300 \times 10^6$ B.t.u.'s per hour are equivalent to over 1,000,000 dollars per year in terms of steam (at a value of about 40 cents per thousand pounds) that could be generated.

Over a period of time, a considerable amount of MEA will be lost out the top of the absorber as large volumes of gas carry entrained MEA out the top of the absorber in spite of preventive measures. Further MEA is lost due to pumping losses as large volumes of absorbent are required and therefore circulated to remove the great quantities of $CO_2$ that are typically formed in modern hydrogen production plants. Other common $CO_2$ absorption systems—for example, hot carbonate—are generally similar to the alkanolamine system in the respects described above with only moderate reduction in regeneration heat requirements.

Since the alkanolamine absorbents tend to degrade, a "reclaimer" is commonly used to purify the absorbent. The reclaimer is essentially a small reboiler. It is fed a slipstream of the absorbent from the bottom of the stripper. Only that portion of the slipstream that is vaporized is returned to the stripper system. Heavy tarry material collects in the bottom of the reclaimer and is periodically withdrawn and passed to sewerage as a spent alkanolamine stream. Common practice is to clean the reclaimer as frequently as once a week. The cleaning procedure typically involves taking the reclaimer off-stream, draining the spent alkanolamine and heavy tarry material, and steam cleaning the reclaimer.

It is thus apparent that cleaning the reclaimer will result in losses of absorbent in addition to those losses caused by entrainment and pumping leakage. Although the alkanolamine is expensive, this cleaning procedure is necessary to avoid build-up of corrosive bodies in the $CO_2$ absorption system. Corrosion, which would be worse without the reclaimer, still is a considerable problem in the alkanolamine $CO_2$ absorption systems.

(C) Compression of high purity hydrogen.—Some of the processes which use high purity hydrogen as a reactant are: hydrodesulfurization, operating at pressures between about 100 and 1,500 p.s.i.g.; hydrotreating, operating at pressures between about 200 and 2,000 p.s.i.g.; hydrocracking, operating at pressures between about 450 and 3,000 p.s.i.g.; and thermal hydrodealkylation, operating at pressures between about 450 and 1,000 p.s.i.g. All of these just-mentioned hydroconversion processes may operate at even higher pressures (for example, up to 10,000 p.s.i.g.) than just given but seldom will operate at pressures lower than the range given. Thus it can be seen that many of the processes which use hydrogen require the hydrogen at a high pressure, which in most cases means generated hydrogen gas must be compressed before being passed to a hydrogen-using process.

Basically, all compressors may be considered as belonging to one of two categories; i.e., their principles involve either that of true mechanical compression (positive displacement) or centrifugal compression. Compressors utilizing true mechanical compression are so considered because the act of volumetric reduction is accomplished by means of a compressing element. The compression element may be in the form of a piston which in its particular motion entraps and displaces gas within a suitably designed and fully enclosed housing. Motion may be reciprocating during which the element, in the form of a piston, passes back and forth within dimensional limits over the same course within a cylinder in a straight-line direction.

Centrifugal compression is accomplished by centrifugal force exerted on an entrapped gas during rotation of an impeller at high speed. Most centrifugal compressors depend primarily on centrifugal force and high tangential velocity of the fluid in the periphery of the impeller (or rotors or blades in the instance of some turbocompressors) to produce the desired head or discharge pressure. In this specification, the terms "centrifugal compression" or "compressor" are meant to include turbine compression or turbocompressors, including, for example, axial-flow compressors. In the broad sense of centrifugal compression used herein, compression is generally effected, at least to a substantial degree, by conversion of velocity head to pressure head.

The reciprocating compressor is used for hydrogen compression, but it has some severe disadvantages, particularly for large-size plants:

(1) All parts are subject to unbalanced, reciprocating stresses; and foundations, frames and other parts must be large. To minimize vibration, speeds are low (400–700 r.p.m.); and capacity is low. Therefore, in large plants, several machines are required. Cost of installing, instrumenting, protecting and piping several machines is high. Considerable land is required, and plants are bigger and more complex, making them more difficult to control.

(2) The reciprocating machine is less reliable than centrifugal machines, and it is common practice to design plants with one or two expensive spare machines ready to come on-stream in the event of a failure.

(3) The reciprocating machine produces a pulsating gas supply which sonically transmits vibration to piping instruments and other plants facilities. Such vibrations can cause hazardous failures with hydrogen at high pressure.

(4) The low speed of reciprocating compressors tends to limit prime movers to low speed, electric motors or gas engines. While it is possible to use high speed steam or gas turbines, large reduction gears must be used. The pounding of the reciprocating loads has led to poor experience yith these units. Hydrocracking and hydrogen manufacturing processes can be designed to produce by-product steam if it could be used in steam turbine drivers. However, for the reasons just given, this byproduct steam is generally not used to drive the reciprocating compressors.

(5) Reciprocating compressors are particularly susceptible to severe damage if liquid is present in the gas being compressed.

By comparison, centrifugal compressors are reliable, rugged, in most cases relatively simple, have large capacities, are relatively small, have balanced stresses, and generally cause relatively little vibration or pulsation in the plants. They can be driven by high speed, steam turbines or gas turbines.

However, centrifugal compressors cannot, with any reasonable degree of feasibility, be used as high purity hydrogen compressors.

Compression ratios (ratio of discharge pressure to inlet pressure for one stage of compression) obtainable with a centrifugal compressor are a function of the molecular weight of the gas to be compressed. With pure hydrogen having a molecular weight of 2, compression ratios are limited to about 1.025. Because of this low compression ratio for hydrogen, centrifugal compressors are not practical to date for compression of high purity hydrogen.

Table I below illustrates the sharp decrease in compression ratio for centrifugal compression as the molecular weight of the gas being compressed decreases. The number of stages used in the compression is the same for each case in Table I.

TABLE I

| | | | |
|---|---|---|---|
| Barometer, p.s.i.a. | 14.4 | 14.4 | 14.4 |
| Inlet temperature, °F | 60.0 | 60.0 | 110.0 |
| k (Cp./Cy. for inlet gas) | 1.11 | 1.398 | 1.36 |
| Inlet capacity, c.f.m. | 20,000.0 | 20,000.0 | 20,000.0 |
| Head, ft.-lb. per lb | 22,000.0 | 22,000.0 | 22,000.0 |
| Molecular weight | 63.0 | 28.95 | 10.1 |
| Inlet pressure, p.s.i.a. | 16.73 | 14.73 | 14.08 |
| Discharge pressure, p.s.i.a. | 79.53 | 29.73 | 17.99 |
| Compression ratio | 4.75 | 2.01 | 1.28 |

As previously indicated, it is not practical to use centrifugal compressors to compress high purity hydrogen to high pressures because of the multitude of stages that would be required. For example, the centrifugal compression ratio (ratio of discharge pressure to inlet pressure for one stage of centrifugal compression) with hydrogen, molecular weight of 2, is limited to about 1.025. Consequently, over 75 stages of centrifugal compression would be necessary to bring the pressure of hydrogen up to 1,700 p.s.i.g. starting from a pressure of 200 p.s.i.g. On the other hand, two stages of a reciprocating positive displacement compressor could increase the pressure from 200 p.s.i.g. to 1,700 p.s.i.g. Thus, in spite of their problems previously discussed, reciprocating compressors have heretofore been used in bringing high purity hydrogen to high pressure.

SUMMARY OF THE INVENTION

According to the present invention an improved process is provided for manufacturing high pressure hydrogen with advantageous integrated steam usage which comprises:

(a) reforming hydrocarbons with low pressure steam to produce hydrogen;

(b) centrifugally compressing the hydrogen;

(c) using high pressure steam to drive a turbine which turbine in turn drives the centrifugal compressor used to compress the hydrogen; and (d) using low pressure exhaust steam from the turbine as said loy pressure steam for reforming hydrocarbons in step (a).

Preferably the low pressure steam is at a pressure between 50 to 550 p.s.i.g., the high pressure steam is at a pressure between 200 and 2,000 p.s.i.g., and there is at least a 150 p.s.i. differential in pressure between the low and high pressure steam. Still more preferably the low pressure steam is at a pressure between 100 to 350 p.s.i.g. and the high pressure steam is at a pressure between 400 to 1600 p.s.i.g.

In certain process embodiments of the present invention it has been determined to be preferable to adjust the molecular weight of the hydrogen gas to be centrifugally compressed by means of injection of a light hydrocarbon into the hydrogen gas prior to centrifugal compression. Generally in these embodiments of the present invention the effluent gases from the steam reformer will be subjected to substantially complete CO shift conversion, substantially complete $CO_2$ removal, and, in some instances, methanation of residual carbon oxides prior to injection of the light hydrocarbon into the hydrogen gas. Butane or a hydrocarbon gas consisting primarily of butane (50% butane or more) is particularly preferred as an injection gas to increase molecular weight of the hydrogen gas so that centrifugal compression may be feasibly employed. U.S. Pat. 3,401,111 discusses the introduction of a light hydrocarbon gas into the hydrogen stream in advance of centrifugal compression. The disclosure of U.S. Pat. 3,401,111 is incorporated by reference into the present specification.

In the most preferred mbodiments of the present invention the hydrogen gas is compressed before complete $CO_2$ removal. The surprising advantages obtained by centrifugally compressing a hydrogen gas stream prior to complete $CO_2$ removal are discussed in our application Ser. No. 736,520. Application Ser. No. 736,520 is incorporated by reference into the present specification. Among the embodiments wherein the hydrogen gas obtained by reforming is compressed prior to complete or prior to the final $CO_2$ removal step in a hydrogen manufacturing train, a particularly preferred embodiment is that wherein the effluent from reforming step (a) is centrifugally compressed prior to CO shift conversion. In certain preferred embodiments of the present invention it is advantageous to have more than one stage of $CO_2$ removal or to have only partial $CO_2$ removal prior to centrifugal compression. The effluent from the steam reforming of hydrocarbons may be subjected to only one stage of shift conversion prior to centrifugal compression as, for example, high temperature CO shift conversion. However, it is generally preferred to effect both high and low temperature CO shift conversion of the reformer effluent at the relatively low pressures existing prior to centrifugal compression.

As explained in our earlier application, Ser. No. 736,520, the molecular weight of the hydrogen-rich feed gas to centrifugal compression should be at least about four.

BRIEF DESCRIPTION OF THE DRAWING

The drawing is a schematic flow sheet of a preferred embodiment of the invented hydrogen manufacturing process with integrated steam usage.

DETAILED DESCRIPTION

Referring now in more detail to the embodiment of the invention shown in the drawing, light hydrocarbon in line 1 is combined with low pressure steam in line 2 and introduced to reforming furnace 3 for reaction to produce a hydrogen gas. Typically the light hydrocarbon is natural gas comprised mostly of methane. The natural gas is desulfurized using activated carbon or molecular sieves to adsorb sulfur compounds. If excessive sulfur compounds remain in the feed, the nickel catalyst which is typically used to speed up the kinetics of the reaction of methane with $H_2O$ is poisoned.

Generally the reforming reaction in furnace 3 takes place at a pressure of about 300 p.s.i.g. and a temperature of about 1500° F. Thus there is substantial heat present in the hydrogen-rich gas containing $CO_2$ and CO withdrawn from reforming furnace 3 via line 4. This heat is removed by boiler feed water (BFW) introduced via line 6 to boiler 5. Steam is withdrawn from the boiler via line 7. The cooled gases are withdrawn from the boiler via line 8. Usually the gases are withdrawn from boiler 5, or other heat exchanger means such as direct water quench, at a temperature of about 700° F.

The gas stream in line 8 contains several percent carbon monoxide which is desirably shifted with steam to produce hydrogen and $CO_2$. The shift conversion is accomplished in shift conversion zone 9. Preferably shift conversion zone 9 is comprised of a high temperature shift conversion step operating at about 650 to 800° F., followed by a low temperature CO shift conversion step operated at about 350 to 500° F. The high temperature shift conversion step employs an iron-chrome catalyst and the low temperature shift conversion stage employs a copper-zinc oxide catalyst.

The hydrogen gas stream, now enriched in hydrogen because of the CO shift conversion, is withdrawn from shift conversion zone 9 via line 10 at about 350 to 500° F. Heat is removed from this hydrogen gas stream by boiler feed water introduced via line 12 to boiler 11. Steam which is produced is withdrawn via line 13. The steam which is produced in boiler 11 is usually about 40 p.s.i.g. steam whereas the steam produced in boiler 5 and withdrawn in line 7 is substantially higher pressure steam. The cool hydrogen gas stream is withdrawn from boiler 11 via line 14 and introduced to separator 15. Condensate which results from cooling the hydrogen gas stream is withdrawn via line 16 from the bottom of separator 15. Typically the hydrogen gas stream entering separator 15 is at a temperature of about 90° F. before cooling subsequent to boiler 11 by exchange with cooling water or by heat exchange with air in a thin fan cooler. The hydrogen gas which has been substantially freed of water but which still contains the $CO_2$ resulting from reforming in furnace 3 and shift conversion in zone 9 is introduced via line 17 to centrifugal compressor 18.

As indicated previously the advantages and many of the other factors pertinent to centrifugal compression prior to complete $CO_2$ removal are disclosed in our application Ser. No. 736,520 which application is incorporated by reference into the present application. Because of the $CO_2$ present in the hydrogen gas feed to centrifugal compressor 18, molecular weight of the hydrogen gas is sufficient so that centrifugal compression is feasible to obtain high pressure hydrogen, for example 900 p.s.i.g. and above. As explained in our earlier application Ser. No. 736,520, if essentially all of the $CO_2$ is removed prior to compression then the molecular weight of the gas is too low to make use of centrifugal compressors feasible. Thus, reciprocating compressors would be required. Reciprocating compressors, in turn, are not as dependable and in many respects are more expensive than centrifugal compressors. More importantly for purposes of the present invention, reciprocating compressors are not amenable to drive by means of a steam turbine driver.

Turbine driver 19 is driven by high pressure steam introduced via line 20. The high pressure steam is obtained from boiler feed water which is introduced to reforming furnace 3 via line 21. The boiler feed water is heated in the convection section of the reforming furnace to generate the high pressure steam. Steam to drive turbine 19 may also be advantageously obtained by further heating in reforming furnace 3 the steam produced in boiler 5 or 11.

As indicated in the "Summary of the Invention," the high pressure steam is at a substantially higher pressure than the low pressure steam exhausting from turbine driver 19 via line 21. Thus, the terms "high" and "low" pressure are relative and are best defined as steam pressure levels having sufficient pressure differential to furnish practical motive power for a turbine driver such as turbine driver 19 but yet with the low pressure exhaust steam being of sufficient pressure to enter a steam hydrocarbon reforming furnace as process steam. Example pressures would be 500 to 1,500 p.s.i.g. high pressure steam, preferably about 900 p.s.i.g., and 150 to 300 p.s.i.g. low pressure steam exhausting from the turbine in line 2.

As indicated earlier, the low pressure steam exhausting from the turbine is combined with natural gas in line 1 and is fed to reforming furnace 3. Thus, the steam generated from the heat in the convection section of reforming furnace 3 is utilized twice in an integrated fashion in the present process for high pressure hydrogen manufacture. The steam is utilized first at its higher pressure in order to drive turbine driver 19 which, in turn, drives centrifugal compressor 18. The low pressure exhaust steam from the turbine is then utilized as process steam which reacts with the light hydrocarbon in reforming furnace 3 to produce a gas stream comprising hydrogen withdrawn in line 4.

Although high pressure steam has been used in other applications to furnish motive power to drive a steam turbine with subsequent utilization of the turbine exhaust steam, it is believed that no use has been proposed such as in the present invention prior to applicants' invention of the integrated process. It must be borne in mind that among other features, the present process integrates the double utilization of steam with centrifugal compression in a high pressure, high purity hydrogen manufacturing process, particularly one wherein the raw hydrogen is produced by reforming.

Referring again to the drawing, a mixture of high pressure hydrogen and $CO_2$ is removed from centrifugal compressor 18 via line 22. $CO_2$ is removed from the $CO_2$-hydrogen gas mixture in $CO_2$ removal zone 23. Preferably, the $CO_2$ is removed by absorption of $CO_2$ into a physical absorbent. The term "physical absorbent" is used herein in contrast to "chemical absorbent." Physical absorbents absorb increasing amounts of the constituent sought to be absorbed, for example $CO_2$, with increasing pressure and release the absorbed constituent by simply reducing the pressure on the absorbent with little or no heating. The absorption mechanism of "chemical absorbents," such as monoethanolamine, involves the formation of salts or other decomposable reaction products; i.e., products which when heated decompose to release the chemically absorbed constituent, for example $CO_2$, and thus regenerate the chemical absorbent. Examples of physical absorbents are methanol, acetone or an N-methylpyrrolidone. As discussed in our Ser. No. 736,520, it is surprisingly advantageous to utilize high pressure $CO_2$ removal, particularly using a physical absorbent in conjunction with centrifugal compression of the hydrogen-$CO_2$ gas mixture.

Product hydrogen is withdrawn from $CO_2$ removal zone 23 via line 24. The product hydrogen may be used directly in a hydroconversion unit such as a hydrocracker or hydrotreater. Typically, centrifugal compressor 18 raises the pressure of the hydrogen-$CO_2$ mixture from about 200 p.s.i.g. to a pressure between about 1,500 and 3,500 p.s.i.g. In a typical hydrogen manufacturing train, the hydrogen gas as obtained from the $CO_2$ removal zone will be subjected to a methanation step in order to convert some residual amounts of carbon oxides to methane because the carbon oxides are usually detrimental to the hydroconversion process.

As indicated previously, in some instances it is preferable to remove the $CO_2$ prior to centrifugal compression and make centrifugal compression feasible by means of introducing a light hydrocarbon such as a gas stream comprised primarily of butanes.

Example

Feed to the steam-light hydrocarbon reforming furnaces in this example is 35,166 lb./hr. of natural gas and 390,000 lb./hr. of 40 p.s.i.g. saturated steam. The natural gas and steam are reacted over a nickel reforming catalyst to obtain an effluent hydrogen-rich gas comprised of $H_2$, $CO_2$, CO, $CH_4$ and $H_2O$ at about 285 p.s.i.g.

Heat input to the reformer furnaces is about 970 million British thermal units per hour ($\overline{\text{MBH}}$), obtained by burning fuel gas. The natural gas and steam reactants are passed through tubes containing the nickel catalyst and the fuel gas is burned in the furnace to supply heat to the tubes. Because of the large amount of heat input there is a considerable amount of heat available in the convection section of the reformer furnaces. Over 500,000 lb./hr. of boiler feed water (BFW) is fed to heat transfer tubes located in the convection section. From this BFW about 525,000 lb./hr. of 1,000 p.s.i.g. steam at 900° F. is produced.

The effluent hydrogen-rich gas from the reformer furnaces is exchanged with heated BFW, then exchanged with the methanator feed, and then passed to a high temperature shift converter. In the high temperature shift converter CO contained in the hydrogen-rich gas is reacted with $H_2O$ at about 700° F. to produce additional $H_2$ and $CO_2$. The effluent hydrogen-rich gas from the high temperature shift converter is quenched with water and passed to a low temperature shift converter where CO is again reacted with $H_2O$ but at about 450° F. over a copper-zinc oxide catalyst to further reduce the CO content in the hydrogen-rich gas. Effluent hydrogen-rich gas from the low-temperature shift converter contains only a few tenths percent CO.

This effluent hydrogen-rich gas is successively exchanged with 40 p.s.i.g. steam, BFW and finally cooling water (CW) in order to cool the hydrogen-rich gas and condense out $H_2O$.

To about 19,474 moles/hr. of cooled hydrogen-rich gas at about 250 p.s.i.g., 3,860 moles/hr. of hydrogen-rich gas from a catalytic reformer unit is added. The catalytic reformer hydrogen-rich gas has a molecular weight of about 7.5. In alternate embodiments of the present invention this reformer hydrogen-rich gas may be used to adjust upwardly to at least about four the molecular weight of the total hydrogen-rich feed gas to the centrifugal compressor *after* $CO_2$ has been removed in part or essentially entirely. However, in the present example the molecular weight of the hydrogen-rich gas is adjusted upward primarily by $CO_2$ which purposely is not removed until after centrifugal compression to high pressure, even though in most instances the $CO_2$ is ultimately removed from the hydrogen manufacturing process at low pressure.

The total hydrogen-rich gas of about 22,334 moles/hr. with an average molecular weight of about 11 is introduced to the first stage centrifugal compressor at about 250 p.s.i.g. and compressed to 637 p.s.i.g. The first stage centrifugal compressor requires about 14,000 brake horsepower (BHP) and has a theoretical horsepower (THP) requirement of 10,800. 220,000 lb./hr. of the high pressure steam generated in the reformer is used to drive the centrifugal compressor. In accordance with the present invention the exhaust steam from the turbine driver at about 350 p.s.i.g. is used as process steam for reforming in the reformer furnaces. That is, the exhaust steam is used for reaction with hydrocarbons in the reformer furnace to produce the hydrogen-rich reformer effluent gas.

After cooling the 637 p.s.i.g. effluent gas from the first stage centrifugal compressor, the 637 p.s.i.g. hydrogen-rich gas is introduced to the second stage centrifugal compressor where the gas is compressed to 1740 p.s.i.g. BHP for the second stage is about 14,000 and THP is about 11,000. Again, about 220,000 lb./hr. of the 1,000 p.s.i.g. steam obtained by heating BFW in the reformer furnace is used to drive the centrifugal compressor. 170,000 lb./hr. of the exhaust steam from the second stage centrifugal compressor turbine driver is added to the 220,000 lb./hr. from the first stage to furnish the total of 390,000 lb./hr. of 350 p.s.i.g. process steam required for the reforming reaction.

The 1,740 p.s.i.g. hydrogen-rich gas from the second stage centrifugal compressor is then passed to $CO_2$ removal where it flows countercurrent to an N-methyl pyrrolidone absorbent in a $CO_2$ absorber operated at about 1,730 p.s.i.g. The N-methyl pyrrolidone absorbent is regenerated primarily by reducing pressure on the $CO_2$-rich absorbent so as to release $CO_2$ from the absorbent. Further regeneration is accomplished by stripping with either nitrogen or air. A total of about 10,000 lb./hr. of 40 p.s.i.g. steam is used in an absorbent "dryer" column to remove water from the N-methyl pyrrolidone absorbent.

1,720 p.s.i.g. hydrogen-rich gas containing only a small amount of $CO_2$ is removed from the top of the $CO_2$ absorber. This purified high pressure hydrogen gas may then be used in a hydro-conversion process but in this example is passed through a methanator for conversion of residual carbon oxides to methane prior to use of the high pressure purified hydrogen in hydro-conversion.

Compared to a typical prior art hydrogen manufacturing plant producing about 135 million standard cubic feet per day (MSCFD) of hydrogen using standard reciprocating compressors and with no integrated steam usage, the resultant savings using the overall process of the present invention are about $2,000,000 per year in operating costs and about $2,000,000 for initial capital investment.

Although various specific embodiments of the invention have been described and shown, it is to be understood they are meant to be illustrative only and not limiting. Certain features may be changed without departing from the spirit or essence of the invention. It is apparent that the present invention has broad application to the production of high pressure hydrogen using a centrifugal compressor which is driven by a steam turbine. Accordingly, the invention is not to be construed as limited to the specific embodiments illustrated but only as defined in the appended claims.

What is claimed is:
1. A process for producing high pressure hydrogen which comprises:
  (a) reforming hydrocarbons with low pressure steam to produce a gas stream comprising hydrogen;
  (b) centrifugally compressing the hydrogen to obtain a stream comprising compressed hydrogen;
  (c) using high pressure steam to drive a turbine which turbine in turn drives the centrifugal compressor used to compress the hydrogen; and
  (d) using low pressure exhaust steam from the turbine as said low pressure steam for reforming hydrocarbons in step (a), wherein the low pressure steam is at a pressure between 50 and 550 p.s.i.g., the high pressure steam is at a pressure between 200 and 2000 p.s.i.g., and there is at least a 150 p.s.i. differential in pressure between the low and high pressure steam.

2. A process according to claim 1 wherein the low pressure steam is at a pressure between 100 and 350 p.s.i.g. and the high pressure steam is at a pressure between 400 and 1600 p.s.i.g.

3. A process according to claim 1 wherein a light hydrocarbon is injected into the hydrogen gas prior to centrifugal compression.

4. A process according to claim 3 wherein the light hydrocarbon is primarily butane.

5. A process for producing high pressure hydrogen which comprises:
  (a) reforming hydrocarbons with low pressure steam to produce a gas stream comprising hydrogen and $CO_2$;
  (b) centrifugally compressing the hydrogen before the $CO_2$ is completely removed to obtain a gas stream comprising compressed hydrogen;
  (c) removing at least a portion of the $CO_2$ from the compressed gas stream;
  (d) using high pressure steam to drive a turbine which turbine in turn drives the centrifugal compressor used to compress the hydrogen; and
  (e) using low pressure exhaust steam from the turbine as said low pressure steam for reforming hydrocarbons in step (a), wherein the low pressure steam is at a pressure between 50 and 550 p.s.i.g., the high pressure steam is at a pressure between 200 and 2000 p.s.i.g., and there is at least a 150 p.s.i. differential in pressure between the low and high pressure steam.

6. A process according to claim 5 wherein the effluent from reforming step (a) is subjected to at least one stage of CO shift conversion prior to centrifugal compression.

7. A process according to claim 5 wherein the $CO_2$ removal subsequent to the centrifugal compression step is accomplished by physical absorption of $CO_2$.

8. A process according to claim 7, wherein the physical absorption of $CO_2$ is accomplished by using a material selected from the group consisting of methanol, acetone or an N-methyl-pyrrolidone.

9. A process according to claim 7 wherein no $CO_2$ is removed from said gas stream comprising hydrogen and $CO_2$ prior to the centrifugal compression of said gas stream.

10. A process according to claim 7 wherein a portion of the $CO_2$ is removed prior to the centrifugal compression of at least a portion of said gas stream but sufficient $CO_2$ is left in the gas stream so that the molecular weight of the gas stream fed to the centrifugal compression step is at least about four.

References Cited

UNITED STATES PATENTS

| | | | |
|---|---|---|---|
| 2,632,689 | 3/1953 | Latchum | 23—153 |
| 2,870,096 | 1/1959 | Baumann | 23—213 XR |
| 3,147,080 | 9/1964 | Jahnig | 23—212 |
| 3,297,408 | 1/1967 | Marshall | 23—210 XR |
| 3,361,534 | 1/1968 | Johnson et al. | 23—212 XR |
| 3,400,546 | 9/1968 | Karwat | 23—212 |
| 3,401,111 | 9/1968 | Jackson | 23—210 XR |
| 3,418,082 | 12/1968 | Ter Haar | 23—213 |
| 3,420,633 | 1/1969 | Lee | 23—210 |

EDWARD STERN, Primary Examiner

U.S. Cl. X.R.

23—2, 150, 213